United States Patent
Abe et al.

(10) Patent No.: US 11,226,929 B2
(45) Date of Patent: Jan. 18, 2022

(54) WORM DATA FALSIFICATION DETECTION

(71) Applicant: INTERNATIONAL BUSINESS MACHINES CORPORATION, Armonk, NY (US)

(72) Inventors: Atsushi Abe, Kanagawa-ken (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/264,658

(22) Filed: Sep. 14, 2016

(65) Prior Publication Data

US 2018/0075027 A1 Mar. 15, 2018

(51) Int. Cl.
| | |
|---|---|
| *G06F 16/11* | (2019.01) |
| *G06F 16/16* | (2019.01) |
| *G06F 16/18* | (2019.01) |
| *G06F 16/17* | (2019.01) |
| *G06F 11/30* | (2006.01) |

(52) U.S. Cl.
CPC .............. *G06F 16/11* (2019.01); *G06F 11/30* (2013.01); *G06F 11/302* (2013.01); *G06F 11/3034* (2013.01); *G06F 11/3079* (2013.01); *G06F 16/162* (2019.01); *G06F 16/164* (2019.01); *G06F 16/1734* (2019.01); *G06F 16/181* (2019.01); *G06F 2201/865* (2013.01)

(58) Field of Classification Search
CPC ............. G06F 17/3007; G06F 17/3012; G06F 17/30188; G06F 17/30117
See application file for complete search history.

(56) References Cited

U.S. PATENT DOCUMENTS

| | | |
|---|---|---|
| 5,745,458 A | 4/1998 | Oliver et al. |
| 6,516,325 B1 | 2/2003 | Blanchard et al. |
| 7,155,460 B2 | 12/2006 | McGovern et al. |

(Continued)

FOREIGN PATENT DOCUMENTS

| | | |
|---|---|---|
| JP | 2006228056 A | 8/2006 |
| JP | 2006524392 A | 10/2006 |

(Continued)

OTHER PUBLICATIONS

Hartel et al, "Towards Tamper-evident Storage on Patterned Media", FAST '08: 6th USENIX Conference on File and Storage Technologies, USENIX Association, Feb. 26-29, 2008, San Jose, California, pp. 283-296.

(Continued)

*Primary Examiner* — Aleksandr Kerzhner
*Assistant Examiner* — Aryan D Toughiry
(74) *Attorney, Agent, or Firm* — L. Jeffrey Kelly

(57) ABSTRACT

A computer determines the file system that contains a first partition, a second partition and a third partition. The first partition contains metadata comprising metadata associated with a WORM-specified file, and metadata associated with a rewritable file. The second partition contains a file body of a file and a copy of the metadata. The third partition contains metadata associated with the WORM-specified file. The computer receives a request to set a file setting of a target file to a WORM setting. The computer stores metadata associated with the target file in the first partition, the second partition, and the third partition.

17 Claims, 10 Drawing Sheets

(56) References Cited

U.S. PATENT DOCUMENTS

| | | | |
|---|---|---|---|
| 9,639,540 B2* | 5/2017 | Sparkes | G06F 16/1774 |
| 9,659,028 B2 | 5/2017 | Abe et al. | |
| 9,659,029 B2 | 5/2017 | Abe et al. | |
| 2004/0186858 A1 | 9/2004 | Mcgovern et al. | |
| 2005/0270930 A1 | 12/2005 | Uemura | |
| 2006/0085487 A1* | 4/2006 | Hara | G06F 16/181 |
| 2007/0083568 A1* | 4/2007 | McGovern | G06F 16/181 |
| 2008/0172563 A1 | 7/2008 | Stokes | |
| 2011/0191305 A1 | 8/2011 | Nakamura et al. | |
| 2011/0238716 A1* | 9/2011 | Amir | G11B 27/032 |
| | | | 707/823 |
| 2012/0079174 A1* | 3/2012 | Nellans | G11C 11/40607 |
| | | | 711/103 |
| 2014/0240868 A1* | 8/2014 | Inch | G11B 20/1205 |
| | | | 360/94 |
| 2015/0095566 A1* | 4/2015 | Itagaki | G06F 3/0682 |
| | | | 711/111 |
| 2015/0120740 A1* | 4/2015 | Abe | G06F 21/00 |
| | | | 707/740 |
| 2015/0120741 A1 | 4/2015 | Abe et al. | |
| 2015/0127616 A1* | 5/2015 | Hasegawa | G06F 16/156 |
| | | | 707/661 |
| 2015/0370845 A1* | 12/2015 | Haustein | G06F 16/1827 |
| | | | 707/690 |
| 2016/0012257 A1 | 1/2016 | Klein et al. | |
| 2016/0042760 A1 | 2/2016 | Hasegawa et al. | |
| 2017/0171631 A1* | 6/2017 | Peterson | H04N 21/472 |
| 2018/0075027 A1 | 3/2018 | Abe et al. | |
| 2018/0165282 A1 | 6/2018 | Abe et al. | |

FOREIGN PATENT DOCUMENTS

| | | |
|---|---|---|
| JP | 2006338345 A | 12/2006 |
| JP | 2008033517 A | 2/2008 |
| JP | 2015082291 A | 4/2015 |
| WO | 2013054597 A1 | 4/2013 |

OTHER PUBLICATIONS

Pending Application 2013-221185 (Japan), filed Oct. 24, 2013, entitled: "File System Implementing Write Once Read Many (WORM)", pp. 1-27.

IBM: List of IBM Patents or Patent Applications Treated as Related (Appendix P), Mar. 20, 2018, pp. 1-2.

* cited by examiner

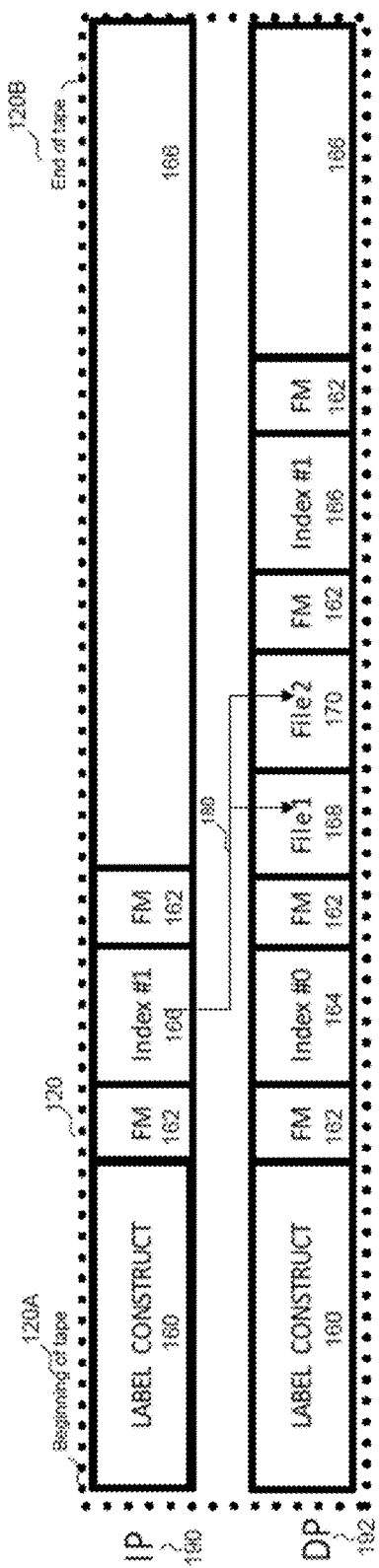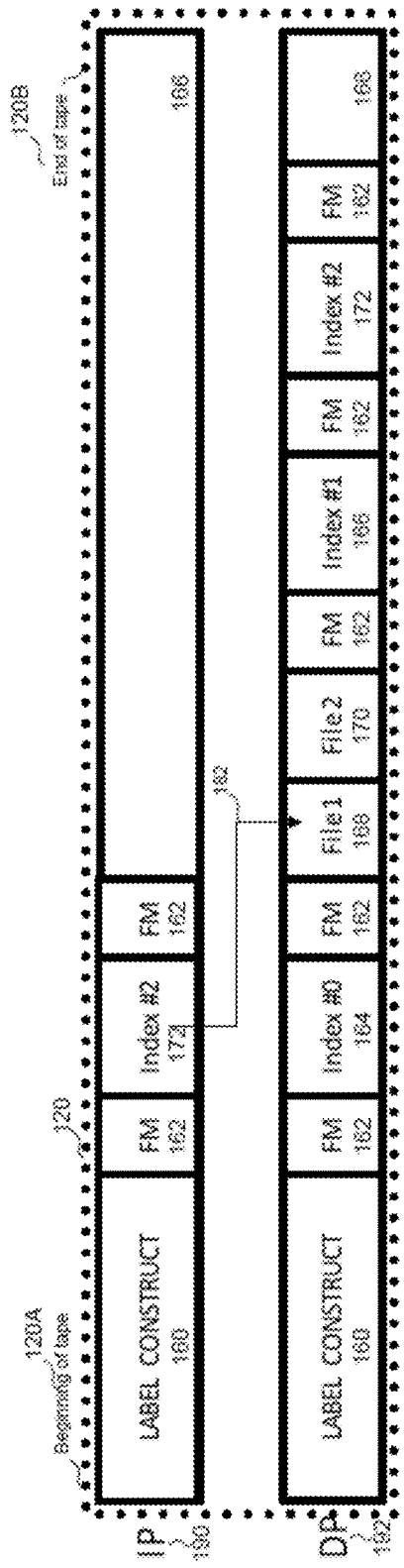

WORM DATA FALSIFICATION DETECTION

BACKGROUND

The present invention relates generally to the field of magnetic tape data storage, retrieval, protection, and verification, and more particularly to protecting data falsification in a file system implementing write once read many data protection (WORM).

Magnetic tape ("tape") data storage systems are widely used to store digital data. Tape data storage systems provide increased data storage space and longevity, for reduced costs. Modern magnetic tapes are commonly packaged in tape cartridges or cassettes. A tape appliance or a tape drive is a device that performs writing or reading of digital data from the tape.

Digital data may be written on tapes of different lengths and widths. One of the standards that defines tape properties is a Linear Tape Open (LTO) standard. The LTO standard defines a raw data capacity, speed of reading of uncompressed data, WORM capabilities, encryption methods, and maximum number of partitions on a tape. For example, TS11x0 cartridge tape such as TS1150, may store up to 10 TB of data, has a maximum data reading speed of 300 Mb/s, is capable to store WORM data, and may be formatted to several partitions.

Tape partitioning is a creation of one or more regions (strips) on a magnetic tape so that an operating system may manage the data in each region of the tape separately. One of the partitioning standards that was adopted by the LTO is a Linear Tape File System (LTFS). The LTFS standard formats a tape in a special way that allows to see the files and directories on the tape directly after mounting of the tape cartridge. In addition, the files can be viewed by the operation system without any additional software and can be accessed and used as if it is a hard disk drive (HDD) or a removable flash drive file system, such as, for example, allowing the user to manage and store files in folders (directories), copy, rename and delete files, use drag and drop and copy and paste functionality without waiting while the tape appliance is reading all the data recorded on the tape.

The LTFS format defines at least two partitions on a tape. One partition, known as an Index Partition (IP), is used to store the metadata of all the files and folders (henceforth "file", "files") recorded on a tape. The other partition is Data Partition (DP), where all the content of the files are stored including files body and files metadata. In LTFS standard, file content is appended to the end of the tape (free space) and deleted files do not free up space on the tape. The division of the tape to two partitions, created by the LTFS standard, is particularly useful for Write Once Read Many (WORM) data storage, because WORM file attribute is stored in metadata located in the IP allowing the operation system to determine instantly if the file is a read only (WORM) file. The WORM file attribute is widely used, for example, to store bank transactions in a real time because the data, once written, would not be deleted or modified.

Tape cartridge may be dedicated as a WORM tape and hence contain only the files that cannot be modified. In other embodiments, a tape may store both regular files that may be deleted or modified and WORM files which may not be modified. A software program, such as a device driver or an operating system is programmed to identify WORM files settings of the tape or files by special attributes.

SUMMARY

Embodiments of the present invention provide a system, method, and computer program product for falsification detection in WORM data. A computer determines the file system that contains a first partition, a second partition and a third partition. The first partition contains metadata comprising metadata associated with a WORM-specified file, and metadata associated with a rewritable file. The second partition contains a file body of a file and a copy of the metadata. The third partition contains metadata associated with the WORM-specified file. The computer receives a request to set a file setting of a target file to a WORM setting. The computer stores metadata associated with the target file in the first partition, the second partition, and the third partition.

BRIEF DESCRIPTION OF THE DRAWINGS

FIG. 1D illustrates an example LTFS formatted tape after files are written to the tape in accordance with an embodiment of the present invention;

FIG. 1E illustrates an example of a third party falsification of the tape data by appending falsified metadata to both IP and DP partitions, in accordance with an embodiment of the present invention;

DETAILED DESCRIPTION

Figure 1A:
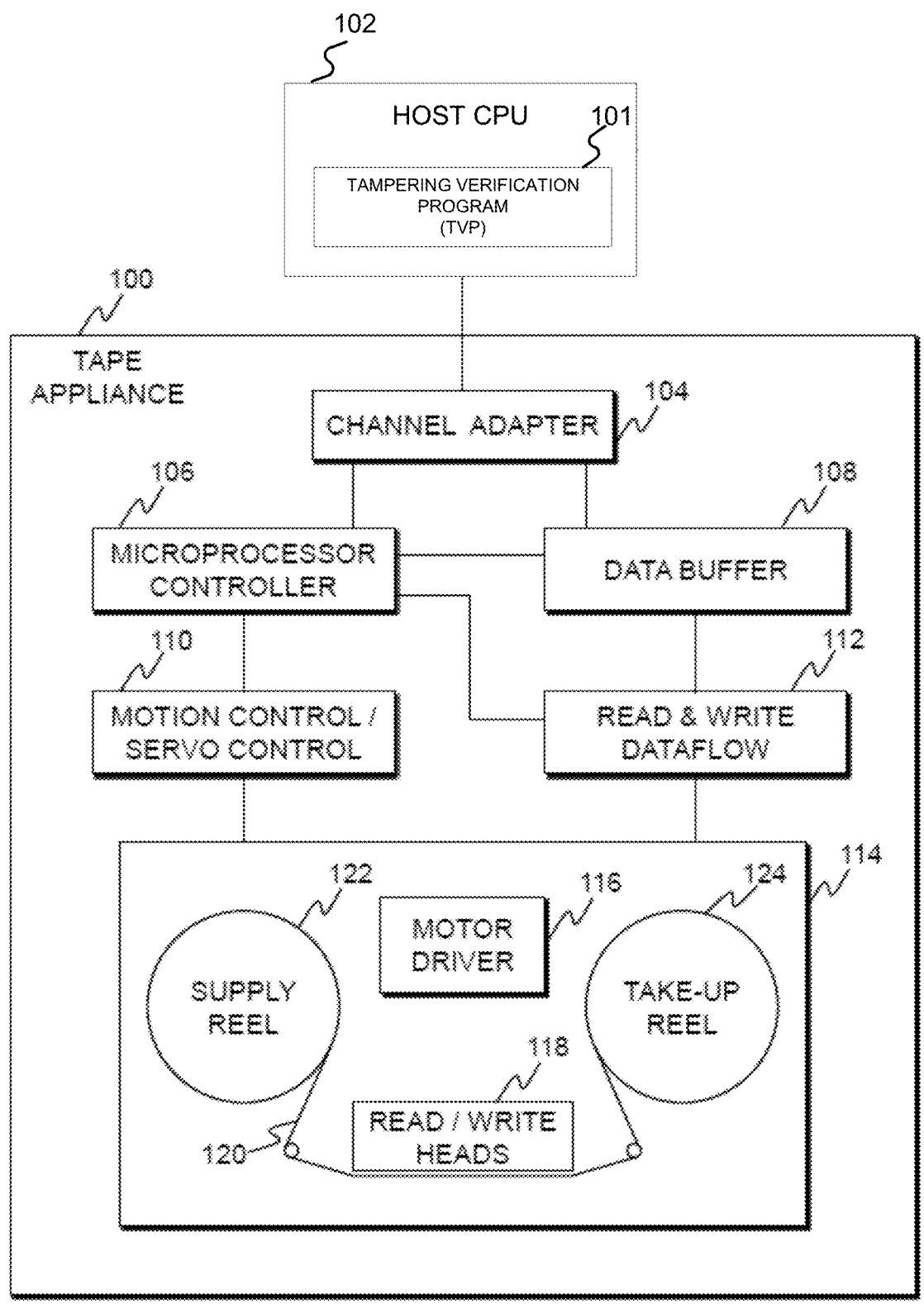
FIG. 1A is a functional block diagram illustrating a WORM data falsification detection system, in accordance with an embodiment of the present invention.

Aspects of the present invention, as appreciated by one skilled in the art, may be embodied as a system, method, or computer product. Accordingly, aspects of the present invention may take the form of an embodiment combining software (including firmware, resident software, micro-code, etc.) and hardware aspects all generally be referred to as a "module", "method" or "system." Furthermore, aspects of the present invention may take the form of a computer program product embodied in one or more computer-readable medium(s) having computer-readable program code/instructions embodied thereon including controllers, microcontrollers or computer processing units.

Various aspects of the present invention are described below with reference to flowchart illustrations and/or block diagrams of methods, apparatus (system) and computer program products. Embodiments of the present invention will now be described in detail with reference to the accompanying Figures.

According to the LTFS standard, data may be protected by changing a file attribute to a WORM file. Changing the file attribute to a WORM file flags the file so a software program recognizes that the file is unmodifiable (impossible to delete or change) and the device driver or operation system software would deny any attempt to modify or delete the WORM file. Hence, by setting a tape, directory or file attribute to a WORM, the data is protected from modifications because the device driver or the operation system that controls the tape appliance will refuse any attempt to modify files with WORM attribute.

Contrary to other storage devices, such as HDD and SSD, tape cartridges are easy to remove (unmount) and typically tape cartridges are frequently used to transfer confidential information from one place to another when transfer of data through a network is not secure enough or is undesirable. Easy transferability of tape cartridges makes recorded data vulnerable to falsification by malicious third parties when tape cartridges are not in possession of the owner. WORM protected data, such as dedicated tapes, directories and files, may be falsified by using a special computer software that may change the WORM file attribute or delete file data despite WORM file protection settings. However, data falsification is a cumbersome process due to magnetic tape length and large amounts of data recorded on the tape.

Typical recorded amounts of data stored on a tape makes finding and falsifying a specific file in LTFS formatted tape a time consuming task that takes several hours to perform. However, third parties found an easy way to falsify WORM data as described in detail below.

In accordance with the LTFS standard, whenever a tape is mounted to a tape appliance, the operating system or device driver reads, through the tape appliance, all recorded metadata from the Index Partition (IP) of the tape and displays the files listed on the disk without special software. For example, after mounting of a tape cartridge the user may access all the folder structures, file names, and properties of all the files recorded on the tape. The difference between a tape and an HDD is in the speed of access of the content of the files because when the user requests access a specific file the tape appliance rewinds the tape to the beginning of the specific file and reads the file body from the Data Partition (DP). If there are any discrepancies in the metadata recorded in IP, such as data is corrupted or unreadable, the same metadata may be read and restored from the end of the Data Partition (DP) of the tape. Due to the small size of the metadata index files, a malicious third party may easily rewrite or change the index file, by simply changing the data in IP representing a specific pointer to file's content (body) recorded in the DP. Typically, file structures, indexes and metadata are read from the IP index file and after tampering the file is written back to IP and appended at the end of DP. This method to falsify the data recorded on the tape is used because this falsification process may take only minutes, while searching for, and changing, the specific file from the recorded data may take several hours.

An embodiment of the present invention, provides a system, a method, and a program product for detecting WORM files falsifications on a tape.

FIG. 1A is a functional block diagram illustrating a WORM data falsification detection system. A WORM data falsification detection system includes a tape appliance 100, a host CPU 102 that is connected to the tape appliance 100 and a Tampering Verification Program 101 (TVP 101) that is executed on the host CPU 102, in accordance with an embodiment of the invention.

In an example embodiment, a tape appliance 100 may be a tape drive. Tape appliance 100 may include several components providing control and data transfer system for reading and writing data on magnetic tape 150 that was received from host CPU 102.

Tape appliance 100 components may include a channel adapter 104, a computer, such as microprocessor controller 106, a data buffer 108, a read/write data flow circuit 112, a motion control system 110, and a tape interface system 114 that includes a motor driver circuit 116 and read/write heads 118.

Microprocessor controller 106 provides overall control functionality for the operations of all components of tape appliance 100. The functions performed by microprocessor controller 106 may be programmable via microcode routines according to desired tape drive operational characteristics.

For example, during data write operations, microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium 120.

A read/write dataflow circuitry 112 is responsible for executing all read/write data transfer operations under the control of microprocessor controller 106. Formatted physical data from read/write circuitry 112 is communicated to tape interface system 114.

A tape interface system 114 includes one or more read/write modules in read/write head unit 118, and drive motor components (not shown) for performing forward and reverse movement of a magnetic tape medium 120 mounted on a supply reel 122 and a take-up reel 124.

The drive components of tape interface system 114 are controlled by motion control system 110 and motor driver circuit 116 to execute tape movements such as forward and reverse recording and playback, rewind and other tape motion functions.

Figure 1B:
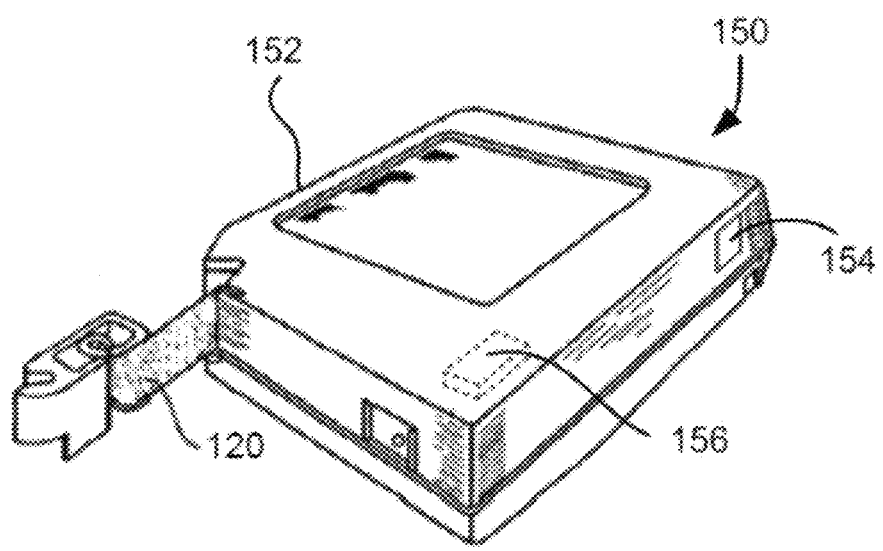
FIG. 1B illustrates an example tape cartridge, in accordance with an embodiment of the present invention.

Cartridge memory reader 126 interacts with nonvolatile memory of a tape cartridge, such as cartridge memory 156, as described in greater detail with relation to tape cartridge 150 of FIG. 1B.

According to an example embodiment, host CPU 102 may be a controller, a micro-controller, or a computer that receives and sends data to be written or read from magnetic tape medium 120. A host CPU 102 is connected to tape appliance 100 through channel adapter 104 and runs a Tampering Verification Program 101 (TVP 101).

Host CPU 102 may be connected to tape appliance 100 by wired, wireless or a network connection. In other embodiments, the network connection may be an intranet, a local area network (LAN), or a wide area network (WAN).

The network may include, for example, wired, wireless (such as Wi-Fi, Bluetooth, or combined) or fiber optic connections. In other embodiments, network may be implemented as the Internet, representing a worldwide collection of networks and gateways to support communications between devices connected to the Internet or other type of network either wired or wireless which allows the communications between tape appliance 100 and host CPU 102. In general, network may be any combination of connections and protocols that will support communications between tape appliance 100 and host CPU 102.

A TVP 101 is a software program that is be executed on host CPU 102 and verifies whether WORM data on a tape was falsified. In addition, TVP 101 controls the access to a WORM data by preventing modification of the WORM data on a tape. Each time during mounting TVP 101 determines whether WORM files were previously recorded on the tape and verifies that WORM files were not falsified or modified by comparing WORM files metadata intentionally recorded in different partitions of the tape. During session TVP 101 denies any attempt of the user to modify WORM files recorded on the tape and during unmounting it records the WORM files metadata added in the current session. Detailed description of TVP 101 operations is described in FIG. 2A-D below.

FIG. 1B illustrates an example embodiment of a tape cartridge 150 according to an example embodiment. Tape cartridge 150 may be used with a system such as tape appliance 100 shown in FIG. 1A.

According to an example embodiment, tape cartridge 150 includes housing 152, magnetic tape medium 120 ("tape") in housing 152, and cartridge memory 156 coupled to housing 152. In other embodiments, cartridge memory 156 may be embedded inside housing 152. In further embodiments, cartridge memory 156 may be attached to the inside or outside of housing 152 without modification of housing 152.

According to an example embodiment, microprocessor controller 106 uses cartridge memory 156, via cartridge memory reader 126, as a temporary storage for information about data that is to be written in both running directions of magnetic tape medium 120, such as a generation value of an LTFS indexes. In further embodiments, cartridge memory 156 may store information regarding tape partitioning, WORM data attributes, such as when all the information on a tape is write protected and once written cannot be modified, and other information regarding using of the magnetic tape medium 120.

In an example embodiment, tape cartridge 150 meets the standard specifications of one or more of Linear Tape Open (LTO) generation standards, such as, for example, LTO-6. In such an embodiment, supply reel 122 may be integral to the LTO tape cartridge and connected to beginning of the tape 120A, and the end of tape 120B is connected to a leader pin (not shown) which is mechanically grasped by features (not shown) of tape interface system 114 and threaded onto take-up reel 124.

According to LTO standard, magnetic tape medium 120 is formatted in LTFS format to two or more partitions. Data management on a tape with LTFS partitions and read/write process is described in greater detail in FIG. 1C and FIG. 1D below.

Figure 1C:
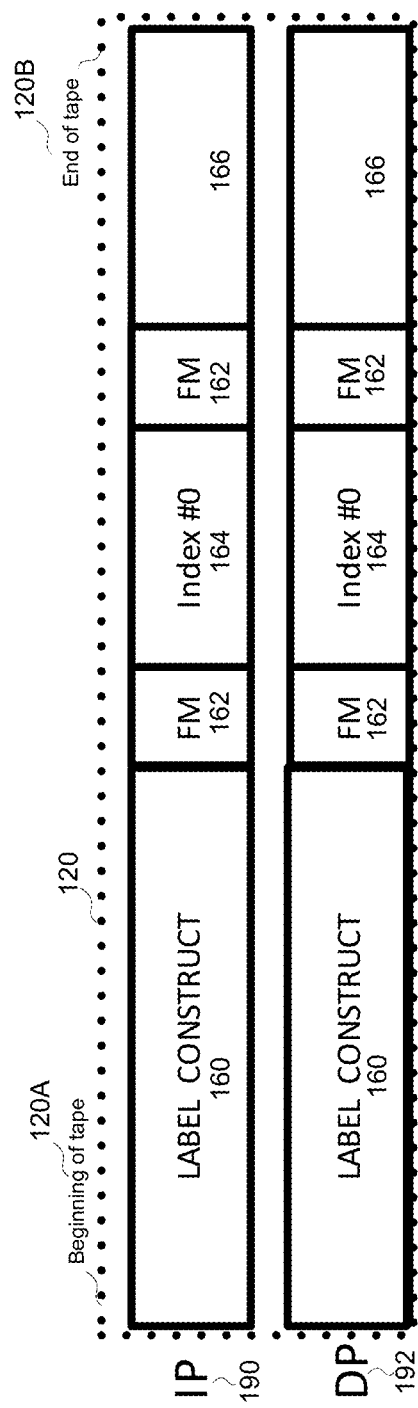
FIG. 1C illustrates an example tape partitioning after formatting the tape in LTFS format, in accordance with an embodiment of the present invention.

FIG. 1C illustrates an example embodiment of an LTFS magnetic tape medium 120 partition structure. After magnetic tape medium 120 is formatted, it is divided into at least two partitions.

First partition, IP 190, is an Index Partition that is used to store metadata of all files recorded on magnetic tape medium 120. An IP 190 stores filesystem metadata that includes at least filenames, files attributes, date stamps, extended file attributes, folder name and structure, and location to body of each file (pointer) recorded on DP 192 (Data Partition).

Second partition, DP 192, is a major data partition, which stores a contents of each file and in addition, DP 192 also used to back up the metadata recorded on IP 190.

After formatting both IP 190 and DP 192 partitions include same initial information that includes label construct 160, Index #0 164 and a free space 166. Each block of information recorded on each partition is divided by a File Mark, such as FM 162 that signals to tape appliance 100 software that a new block of data or file begins after each FM 162.

According to an example embodiment, label construct 160, may contain general information regarding the tape format such as Vol1 Label and LTFS label. An initial index, Index #0 164, may be an XML schema file that is appended during unmounting to include all the metadata of the files recorded on magnetic tape medium 120.

When a file is added to the magnetic tape medium 120, the body of the file is appended to DP 192 but the metadata is stored initially only in RAM of host CPU 102. When a command to eject the tape cartridge 150 from tape appliance 100 is received, the updated metadata is recorded from the RAM of host CPU 102 to the IP 190 of magnetic tape medium 120. Writing of files to magnetic tape medium 120 is described in greater detail in FIG. 1D below.

FIG. 1D illustrates an example tape data structure after files are recorded to magnetic tape medium 120 in accordance with an embodiment of the present invention. Whenever tape cartridge 150 is mounted to tape appliance 100, host CPU 102 reads the data from the IP 190 and stores it in RAM. When files are deleted from magnetic tape medium 120 the host CPU 102 software is updating the metadata that is stored in the RAM and then writes it to IP 190, without physically deleting the file body from magnetic tape medium 120.

When files are added to the magnetic tape medium 120, the body of each file is written to the DP 192 while the metadata is only updated in the RAM of host CPU 102 and is written to the IP 190 partition of magnetic tape medium 120 only during tape unmounting sequence. For example, if File1 168 and File2 170 are recorded to the tape, host CPU 102 writes the body of file1 168 and the body of file2 170 to the DP 192 but only updates the metadata in the memory of host CPU 102 (RAM) without writing the metadata to the IP 190. Before unmounting of the tape, host CPU 102 writes the tape system metadata, including File1 and File2 metadata, to the IP 190 as Index #1 166 and appends the Index #1 166 to the end of DP 192 as a backup. Index #1 166 includes pointer 180 to added File 1 168 and File2 170 bodies. When a tape is mounted again the Index #1 166 file is read from IP 190 to the RAM and the files appear as recorded on the tape. In other embodiments, only the changes to the IP 190 that occurred after the previous session are appended to the IP 190 and backed up to the DP 192. According to an example embodiment, if File2 170 is a WORM file then File2 170 may not be updated or deleted.

FIG. 1E illustrates an example of a third party falsification by appending Index #2 172 to both the IP 190 and the DP 192 partitions. In this example, a third party may delete a WORM file without physically deleting file body from DP 192 partition. This may be done by either removing of the pointer 180 to the body of the file or by writing tampered metadata, Index #2 172, which has only the information that the third party wants to keep on a tape. To continue our example, a third party may delete a WORM file, File2 170 by preparing a falsified metadata, Index #2 172. An Index #2 172 may include only metadata and a pointer 182 to File1 168 and write it to IP 190 and DP 192 partitions as Index #2 172 as shown in the FIG. 1E. When the tampered tape will be mounted to tape appliance 100, Index #2 172 is read to the RAM of the host CPU 102 and therefore will show that only File1 168 is recorded on the tape. Although this tampering of the metadata may be discovered by reading all the indexes, such as Index #0 164, Index #1 166, and Index #2 172, from DP 192 and analyzing whether any pointer was changed or removed, this procedure requires reading the whole DP 192, which takes several hours. By introducing an additional partition, WORM Information Partition (WIP), described in greater detail in FIG. 1F, the third party WORM file falsification may be identified.

Figure 1F:
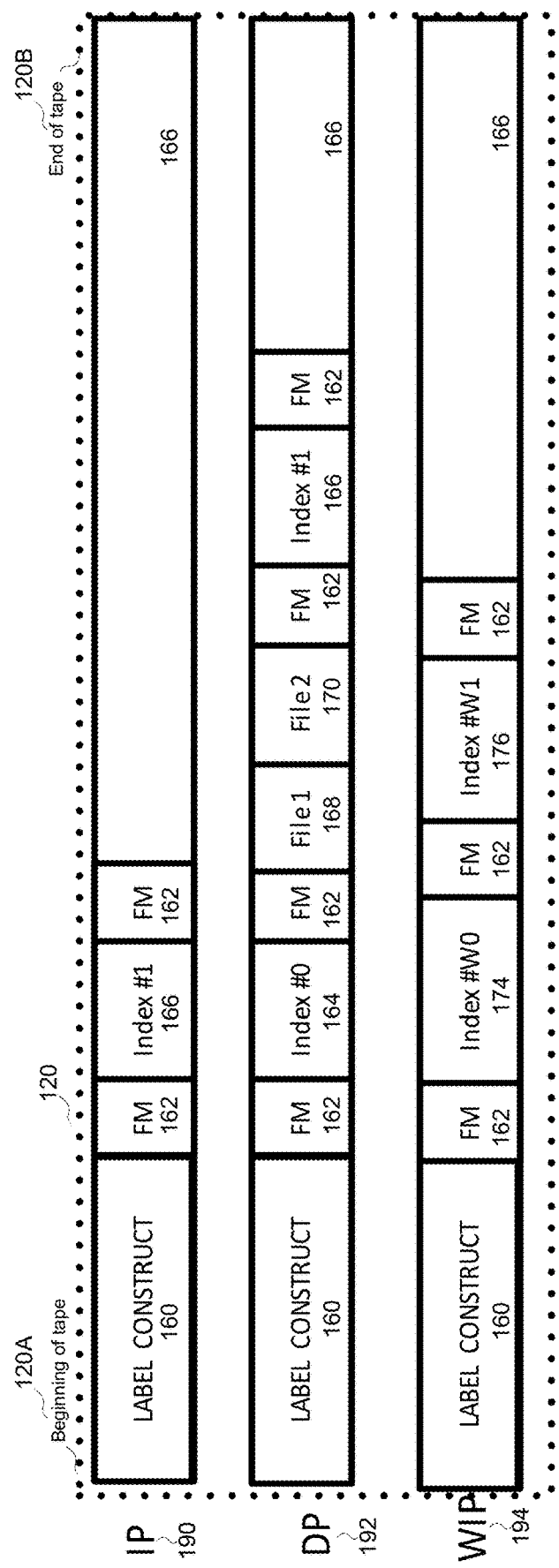
FIG. 1F illustrates an example of additional tape partition (WIP) to prevent WORM files falsification, in accordance with an embodiment of the present invention.

FIG. 1F illustrates an example embodiment of WIP 194 partition that is used by TVP 101 to verify that WORM files were not tampered with, in accordance with an embodiment of the invention. According to an example embodiment, new partition, WIP 194 is added to the tape. According to an example embodiment, WIP 194 is an additional physical partition on magnetic tape medium 120 that stores the metadata of WORM files only. In other embodiments, WIP 194 may be added as an independent metadata file to either IP 190 or DP 192 or both. According to an example embodiment, WORM file metadata is appended at the end of WIP 194, such as Index #W1 176, after each unmounting command is received and before the tape is ejected from the tape appliance 100. In other embodiments, WORM file metadata is appended at the end of WIP 194 when any file with a WORM attribute is added, or when a previously recorded file attribute is changed to a WORM attribute. The WORM files metadata, such as Index #W1 176, is only appended to the end of WIP 194, and never rewritting previous metadata stored on WIP 194, and therefore tracking the WORM file history of the tape. As described below, TVP 101 uses the metadata stored on WIP 194 to verify whether WORM files were tampered with, notifies the user if the WORM files were tampered with, rejects user requests to delete or change a WORM file, changes regular file attributes to a WORM when requested by a user, and updates WIP 194 metadata.

FIG. 2A-D are flowcharts illustrating the operations of TVP 101, operating on host CPU 102, which maintains and validates WORM file metadata recoded on a tape by restricting an access to WORM file metadata and checking WORM metadata for tampering during mounting of the tape. According to an example embodiment, TVP 101 may be a standalone or integrated software program running on host CPU 102 or integrated into operation system or device driver of tape appliance 100. In other embodiments TVP 102 may be incorporated into LTFS software. The operations and functions of TVP 102 after the mounting of a tape are described in further detail below with regard to FIG. 2A.

Referring to decision 202, TVP 101 checks whether tape cartridge 150 stores WORM files or tape cartridge was dedicated as a WORM. According to an example embodiment, TVP 101 checks whether there is WIP 194 partition. In other embodiments, TVP 101 identifies whether the tape cartridge 150 is a WORM tape (append only) by reading cartridge memory 156 that includes information whether tape cartridge 150 is a WORM tape. In further embodiments, TVP 101 may read metadata from IP 190 and if one of the files attributes has a WORM specification, such as, for example, a WORM flag in the file metadata index, then the tape is a WORM tape. If the tape is a WORM tape or includes at least one WORM file TVP 101 proceeds to step 204 (decision 202, "Yes" branch). If the tape is not a WORM tape (decision 202, "No" branch), TVP 101 proceeds to step 214.

Referring to step 204, TVP 101 determines partitions IP, DP and WIP. According to an example embodiment, WORM tape may be divided into at least 3 partitions where first partition stores files metadata in an index format (IP 190), second partition stores files body (DP 192) and third partition stores WORM files metadata (WIP 194). Each partition may be identified either by analyzing label construct 160 (FIG. 1F) of each partition or by analyzing indexes recorded immediately after label construct 160. In other embodiments, the number of partitions and their location on the tape may be determined by reading the cartridge memory 156, or the number of partitions and their location on the tape is pre-determined and incorporated in TVP 101 software. In further embodiments, the WIP 194 may be a virtual partition, stored either in IP 190 or DP 192 partitions at a specific location or after at a specific location or mark on the tape.

Referring to step 206, TVP 101 reads files metadata from IP. According to an example embodiment, TVP 101 reads all the index file from IP 190 and stores them in the memory (such as, RAM) for presenting the file system to the user and for a faster access to specific files on the tape. TVP 101 receives all the metadata stored in the IP 190 by sending instructions to microprocessor controller 106 through channel adapter 104.

Referring to step 208, TVP 101 reads WIP 194 WORM files metadata from the tape. According to an example embodiment, the WIP 194 partition contains metadata of all the files or directories that were designated as a WORM file on the tape since the tape was formatted. The WIP 194 partition may only be appended and once the file was designated as a WORM file it may not be changed or deleted afterwards and the file metadata is appended to the WIP 194. The WORM files metadata recorded in the WIP 194 may contain: a full path and name of the file, file UID (inode number), a time stamp, an extent (contiguous area of storage reserved for a file) list, and other file attributes.

Referring to decision 210, TVP 101 checks if the WORM files metadata in WIP 194 matches the metadata of corresponding files recorded in IP 190. Due to constraint that WIP 194 is only appended and the data is never deleted, tampering of WIP 194 would require generation of new IP 190 that corresponds to all WORM metadata stored in WIP 194, making data tampering complicated and time consuming. In accordance with an embodiment, TVP 101 compares the metadata of each WORM file stored in WIP 194 with the corresponding parameters of the same file metadata recorded in IP 190. In addition, TVP 101 checks WIP 194 for integrity for example, that multiple instances of the metadata (the same file name and metadata) were not appended more than once or that the same path or UID exists more than once in WORM metadata indexes. If the metadata recorded in WIP 194 partition is different from the corresponding metadata stored in IP 190, or if WIP 194 metadata fails the integrity check, TVP 101 proceeds to step 212 (decision 210, "No" branch). If the metadata in WIP 194 matches the metadata in IP 190 TVP 101 finishes the mounting process (decision 210, "Yes" branch).

Referring to step 214, TVP 101 determines the IP 190 and the DP 192 partitions. According to an example embodiment, if the tape has no WORM files and is not a WORM tape the tape may be divided into 2 partitions or more, where first partition stores files metadata in an index format (IP 190) and second partition stores files body (DP 192). Each partition may be identified either by analyzing label construct 160 (FIG. 1F) of each partition or by analyzing indexes recorded immediately after label construct 160. In other embodiments, the number of partitions and their location on the tape may be determined by reading the cartridge memory 156, or the number of partitions and their location on the tape is pre-determined and incorporated in the TVP 101 software.

Referring to step 216, TVP 101 reads the IP 190 metadata and stores it in a data storage (e.g. RAM) of host CPU 102 for faster display and access of the file system on the tape and ends the mounting process.

Referring to step 212, TVP 101 notifies the user that falsification was made. According to an example embodiment, TVP 101 displays notification of the differences and the name of the file that was falsified. In other embodiment, TVP 101 sends an error notification that either sends a notification that the metadata was falsified or sends a corresponding error code that represents metadata falsification.

Figure 2A:
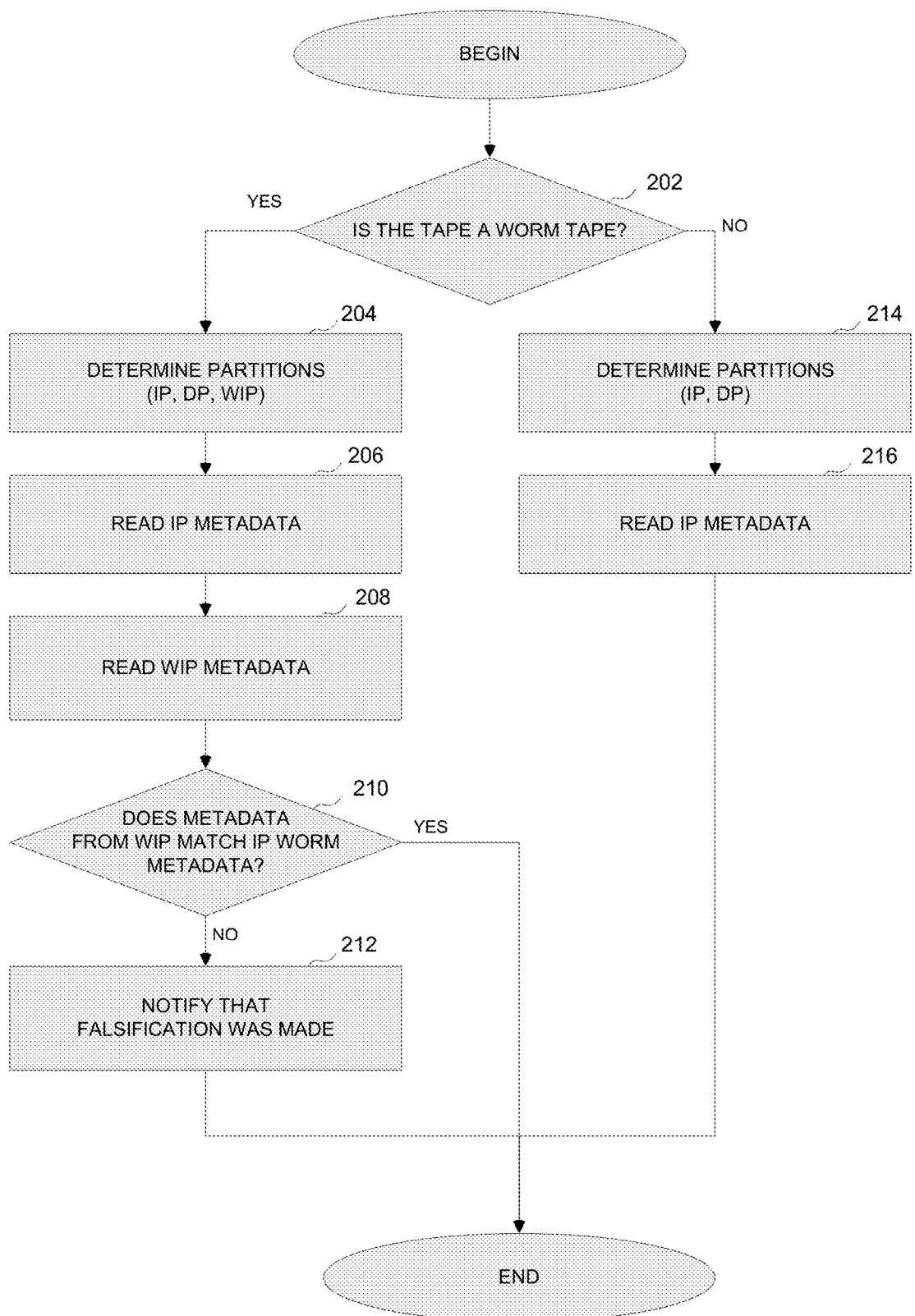
FIG. 2A is a flowchart of a Tampering Verification Program (TVP) for validating WORM data integrity from a tape after mounting, in accordance with an embodiment of the present invention.
Figure 2B:
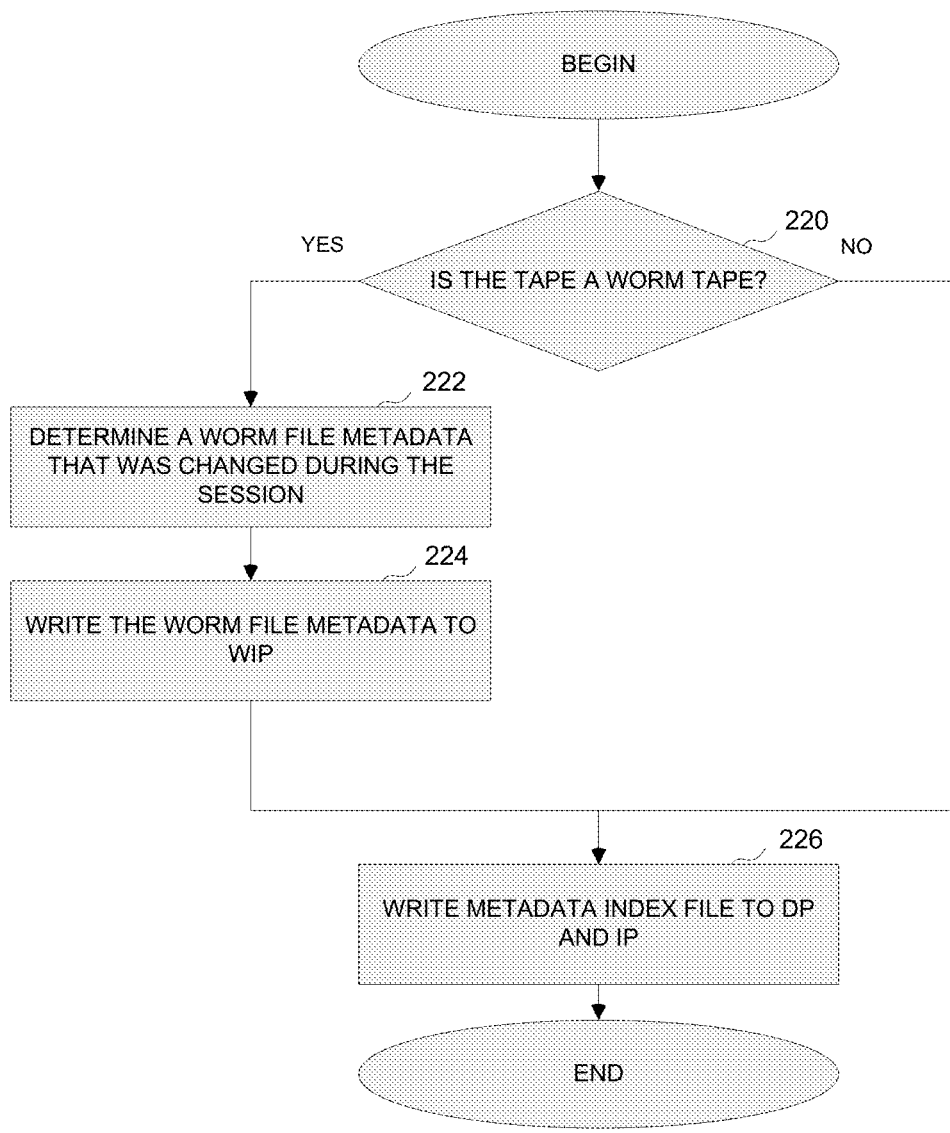
FIG. 2B is a flowchart of TVP for writing metadata to a tape at the end of a session (unmounting), in accordance with an embodiment of the present invention.

Figures FIG. 2B describes the operations and functions of TVP 101 during unmounting of the tape.

Referring to decision 220, TVP 101 checks whether the tape is a WORM tape. According to an example embodiment, during mounting WIP 194 partition metadata is stored in the data storage (e.g. RAM) for future reference and fast access. If WIP 194 metadata is stored in the memory TVP 101 treats the tape as a WORM tape (decision 220, "Yes" branch) and proceeds to step 222. In another embodiment, TVP 101 may treat the tape as a WORM tape by analyzing the IP 190 for WORM file attributes, even if there is no WIP 194 partition metadata recorded on the tape. In further embodiments, the metadata on the tape may be searched for WORM file attributes in any of the partitions available on the tape. If the tape is not a WORM tape TVP 101 proceeds to step 226 (decision 220, "No" Branch).

Referring to step 222, TVP 101 determines a WORM file metadata that was changed during the session. According to an example embodiment, during session, TVP 101, tape appliance 100 driver, or operation system stores all new WORM file assignments in the memory (for example, RAM). Changes in the WORM files metadata may be determined for example, by comparing the recorded file system metadata in IP 190 to the file system metadata stored in memory (RAM) and picking only WORM file metadata that only appear in the memory (RAM). Before unmounting, TVP 101 determines, organizes and prepares updated WORM file metadata to be appended to WIP 194. In other embodiments, WORM metadata may be encoded, encrypted, hashed, or obfuscated before being appended to WIP 194.

Referring to step 224, the TVP 101 writes the WORM metadata in WIP 194. According to an example embodiment, the TVP 101 only appends additional WORM files metadata created during the session to WIP 194 without erasing previous metadata. In other embodiments the WIP 194 metadata may be also recorded to IP 190 or DP 192 as a backup. The backup may be used to validate the data consistency or to recover the WORM files metadata if the tape is damaged. In further embodiments, all WORM files metadata may be overwritten to WIP 194 during unmounting. Overwriting of complete WORM files metadata together with encryption or encoding may be used in order to increase WIP 194 metadata security.

Referring to step 226, TVP 101 writes metadata as an index file to both DP 192 and IP 190 partitions. According to an example embodiment, the metadata of all the files located on the tape 120 is gathered from the RAM memory of host CPU 102 and rewritten to the IP 190 and appended to the end of recorded data in the DP 192 as a backup. This step is performed either after appending WIP 194 partition (step 224) or if the tape is not a WORM tape.

Figure 2C:
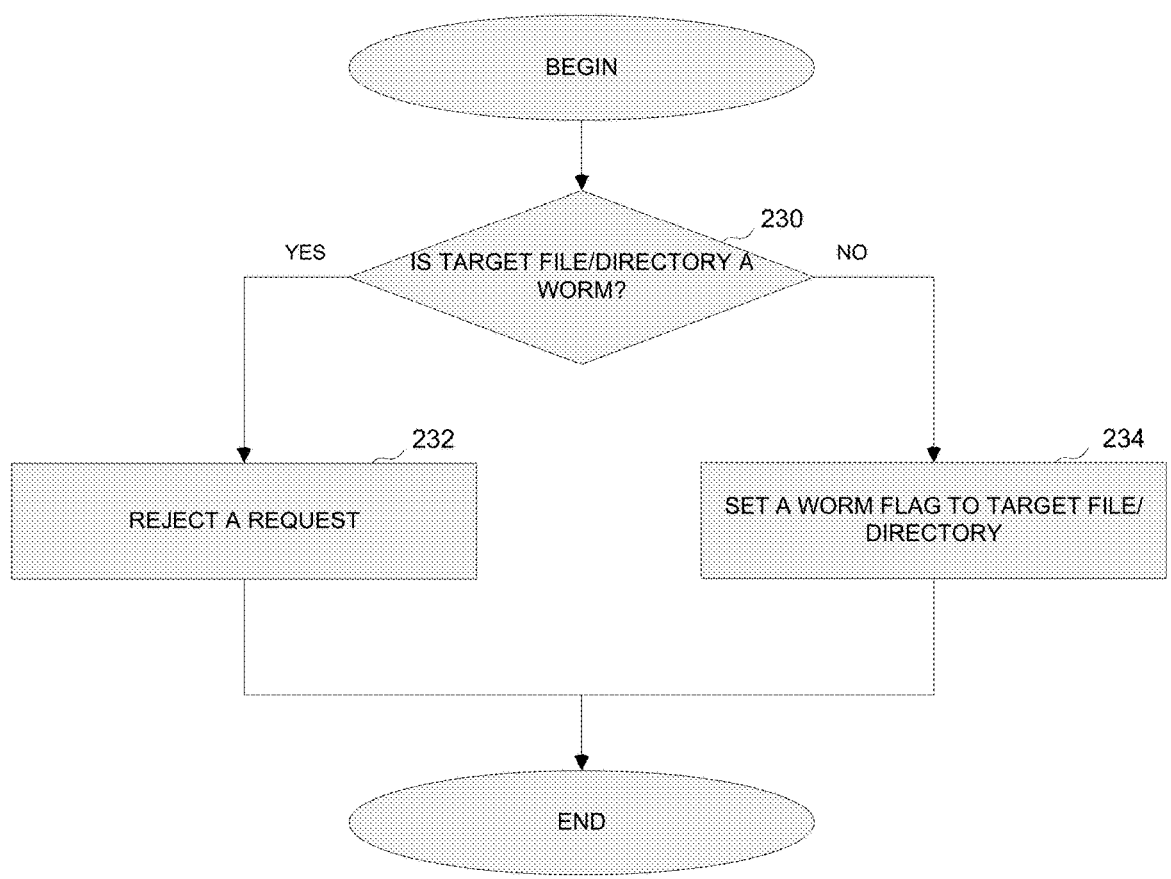
FIG. 2C is a flowchart of TVP for setting the attribute of a target file as a WORM file during the session, in accordance with an embodiment of the present invention.

Figure FIG. 2C describes the operations and functions of TVP 101 to set the target file as a WORM file during a session.

Referring to decision 230, TVP 101 checks whether the target file is a WORM file. According to an example embodiment, TVP 101 accesses the memory where WIP 194 metadata is stored and checks whether the target file path, name, or other identifier of the target file is present. If the target file metadata is stored in WIP 194 metadata the target file is a WORM (decision 230, "Yes" branch), and TVP 101 proceeds to step 232. If the target file is not in WIP 194 metadata and is not a WORM file (decision 230, "No" branch), TVP 101 proceeds to step 234.

Referring to step 232, if the target file is a WORM file TVP 101 rejects the request because this file is already a WORM file.

Referring to step 234, when the target file is not a WORM file, TVP 101 sets a worm file attribute to the target file. According to an example embodiment, TVP 101 updates the IP 190 metadata and WIP 194 metadata stored in the memory (RAM).

Figure 2D:
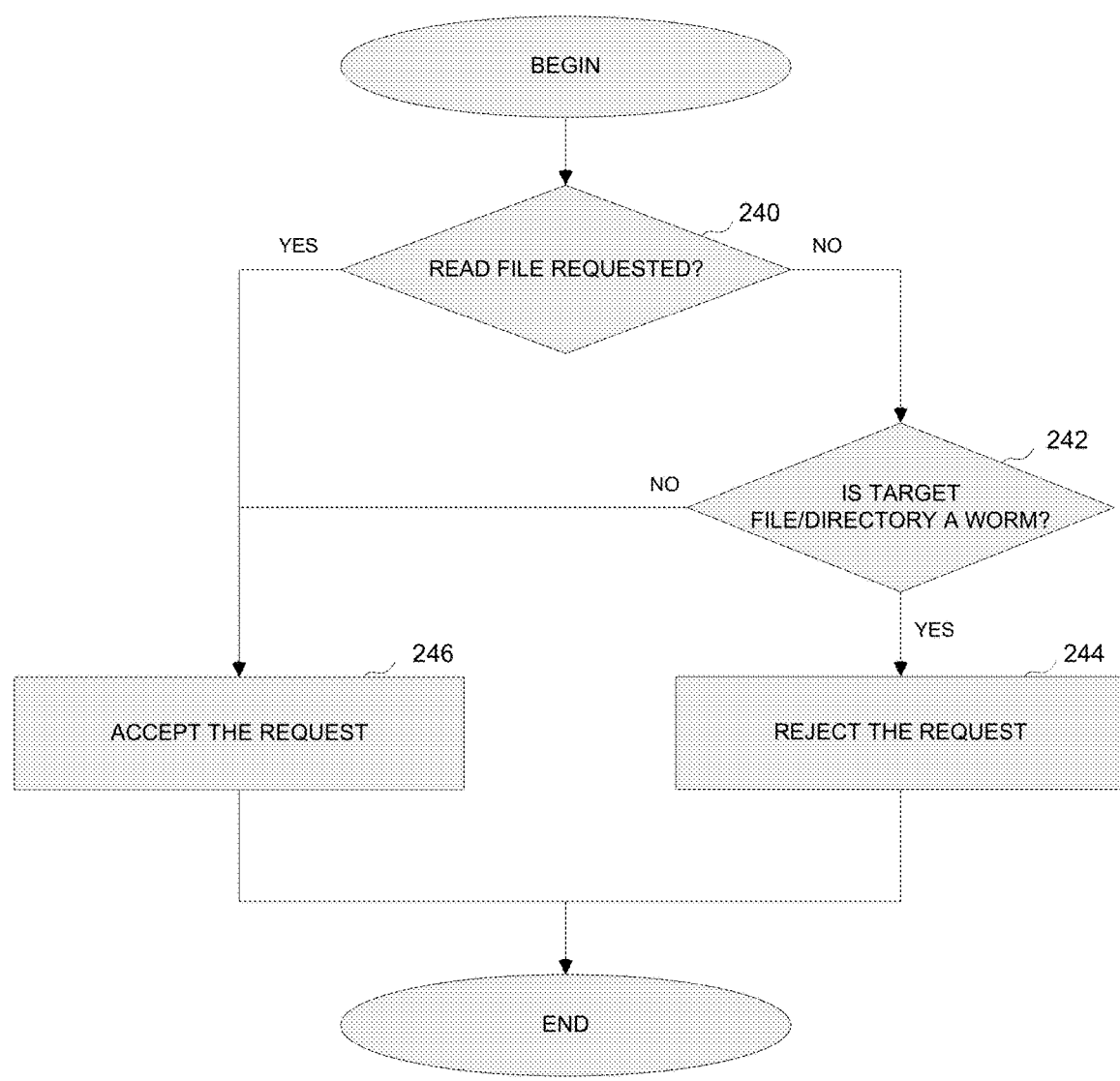
FIG. 2D is a flowchart of TVP for classifying and accessing the target file during the session, in accordance with an embodiment of the present invention.

Figure FIG. 2D describes the operations and functions of TVP 101 to grant access to the target file during a session.

Referring to decision 240, TVP 101 determines whether the user requests a "read only" access to the target file or whether the user selects other operations such as, for example, changing the contents of the file, changing the name or other index or attribute of the target file, or to deleting the target file. If the user requests to read the target file TVP 101 proceeds to step 246 (decision 240, "Yes" branch). If the user requests another operation, then TVP 101 proceeds to decision 242.

Referring to decision 242, TVP 101 checks whether the target file is a WORM file. If the target file attributes appear in the WORM file metadata stored in the memory (RAM) the target file is a WORM file (decision 242, "Yes" branch), and TVP 101 proceeds to step 244. If the target file is not a WORM (decision 242, "No" branch), TVP 101 proceeds to step 246.

Referring to step 244, because the file is a WORM file and the requested operation is not to read the file, TVP 101 rejects the request.

Referring to step 246, if the request was to read the target file or the target file is not a WORM file, TVP 101 accepts the request and permits the operation.

Figure 3:
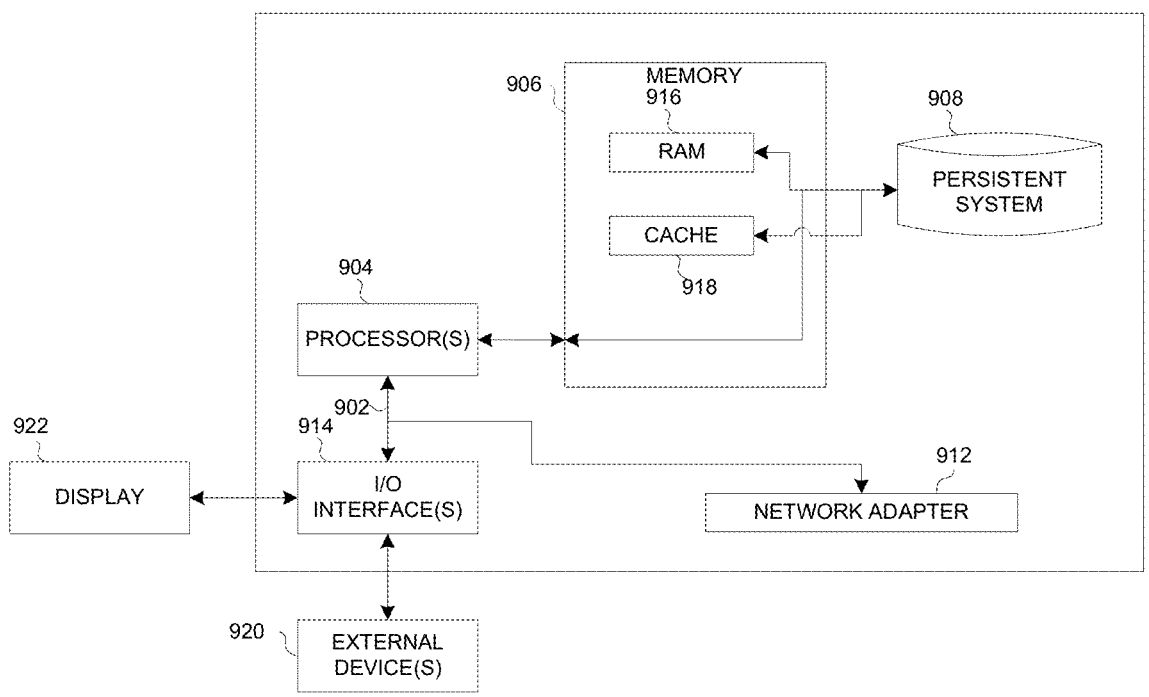
FIG. 3 is a block diagram depicting the example embodiment of hardware components of host CPU 102, and microprocessor controller 106, in accordance with an embodiment of the invention.

FIG. 3 depicts a block diagram of components, such as host CPU 102, microprocessor controller 106 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A host CPU 102, and microprocessor controller 106 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

A TVP 101 is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. TVP may be downloaded to persistent storage 908 through communications unit 912.

I/O interface(s) 914 allows for input and output of data with other devices that may be connected to host CPU 102, microprocessor controller 106. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., TVP 101 may be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a computer-readable storage device, tangible storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of detecting a falsification in a file system of a tape having a WORM (Write Once Read Many) function, comprising:
    determining that the tape includes a first physical partition on the tape, a second physical partition on the tape, and a third physical partition on the tape, wherein the first physical partition contains metadata of the file system comprising metadata associated with a WORM-specified file, and metadata associated with a rewritable file, the second physical partition contains a file body of a file and a copy of the metadata of the file system, and the third physical partition only contains the metadata associated with the WORM-specified file, wherein the metadata associated with the WORM-specified file is only appended on the tape at the end of the third partition when any file with a WORM attribute is added or when a previously recorded file attribute is changed to a WORM attribute, and wherein changing or deleting metadata associated with a WORM-specified file previously stored in the third partition is prohibited;
    receiving a request to set a file setting of a target file to a WORM setting;
    storing metadata associated with the target file in the first physical partition on the tape, the second physical partition on the tape, and the third physical partition on the tape, wherein the metadata associated with the target file in the third partition is appended at the end of the metadata associated with the WORM-specified file in response to receiving an unmounting command;
    receiving a request to change the target file, wherein the request to change the target file comprises an action selected from the group consisting of: renaming the target file, changing the target file content, deleting the target file, changing an attribute of the target file;
    determining the target file metadata;
    determining that the target file metadata appears in the third physical partition;
    based on determining that the target file metadata appears in the third physical partition, rejecting the request to change the target file;
    determining a difference between the metadata in the first partition and the metadata associated with the WORM-specified file in the third partition based on reading the metadata in the first partition and reading the metadata associated with the WORM-specified file in the third partition.

2. The method of claim 1, further comprising:
    based on determining the difference, transmitting a notification of the difference.

3. The method according to claim 2, wherein determining a difference between the metadata in the first partition and the metadata associated with the WORM-specified file in the third partition comprises determining a difference in a parameter of the metadata, wherein the parameter of the metadata is selected from the group consisting of: a full path name, a File UID, file attributes, a time stamp, and an extent list.

4. The method according to claim 2, wherein determining the difference between the metadata in the first partition and the metadata associated with the WORM-specified file in the third partition further comprises:
    determining appearance of multiple instances of the metadata associated with the WORM-specified file in the third partition.

5. The method of claim 1, further comprising storing a target file body in the second partition.

6. The method of claim 1, further comprising:
    receiving a request to change the third partition, wherein the request to change the third partition comprises an action selected from the group consisting of: changing the metadata associated with the WORM-specified file in the third partition, deleting the metadata associated with the WORM-specified file in the third partition, rewriting the metadata associated with the WORM-specified file in the third partition; and
    rejecting the request to change the third partition.

7. A computer program product for detecting a falsification in a file system of a tape having a WORM (Write Once Read Many) function, the computer program product comprising:
    one or more computer-readable storage devices and program instructions stored on at least one of the one or more tangible storage devices, the program instructions comprising:

program instructions to determine that the tape includes a first physical partition on the tape, a second physical partition on the tape and a third physical partition on the tape, wherein the first physical partition contains metadata of the file system comprising metadata associated with a WORM-specified file, and metadata associated with a rewritable file, the second physical partition contains a file body of a file and a copy of the metadata of the file system, and the third physical partition only contains the metadata associated with the WORM-specified file, wherein the metadata associated with the WORM-specified file is only appended on the tape at the end of the third partition when any file with a WORM attribute is added or when a previously recorded file attribute is changed to a WORM attribute, and wherein changing or deleting metadata associated with a WORM-specified file previously stored in the third partition is prohibited;

program instructions to receive a request to set a file setting of a target file to a WORM setting;

program instructions to store metadata associated with the target file in the first physical partition on the tape, the second physical partition on the tape, and the third physical partition on the tape, wherein the metadata associated with the target file in the third partition is appended at the end of the metadata associated with the WORM-specified file in response to receiving an unmounting command;

program instructions to receive a request to change the target file, wherein the request to change the target file comprises an action selected from the group consisting of: program instructions to rename the target file, program instructions to change the target file content, program instructions to delete the target file, program instructions to change an attribute of the target file;

program instructions to determine the target file metadata;

program instructions to determine that the target file metadata appears in the third physical partition;

based on determining that the target file metadata appears in the third physical partition, program instructions to reject the request to change the target file;

program instructions to determine a difference between the metadata in the first partition and the metadata associated with the WORM-specified file in the third partition based on reading the metadata in the first partition and reading the metadata associated with the WORM-specified file in the third partition.

8. The computer program product of claim 7, further comprising:
based on determining the difference, program instructions to transmit a notification of the difference.

9. The computer program product of claim 8, wherein program instructions to determine a difference between the metadata in the first partition and the metadata associated with the WORM-specified file in the third partition comprises program instructions to determine a difference in a parameter of the metadata, wherein the parameter of the metadata is selected from the group consisting of: a full path name, a File UID, file attributes, a time stamp, and an extent list.

10. The computer program product of claim 8, wherein program instructions to determine the difference between the metadata in the first partition and the metadata associated with the WORM-specified file in the third partition further comprises:
program instructions to determine appearance of multiple instances of the metadata associated with the WORM-specified file in the third partition.

11. The computer program product of claim 7, further comprising program instructions to store a target file body in the second partition.

12. The computer program product of claim 7, further comprising:
program instructions to receive a request to change the third partition, wherein the request to change the third partition comprises an action selected from the group consisting of: program instructions to change the metadata associated with the WORM-specified file in the third partition, program instructions to delete the metadata associated with the WORM-specified file in the third partition, program instructions to rewrite the metadata associated with the WORM-specified file in the third partition; and
program instructions to reject the request to change the third partition.

13. A computer system for detecting a falsification in a file system having a WORM (Write Once Read Many) function, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to determine that the tape at least includes a first physical partition on the tape, a second physical partition on the tape and a third physical partition on the tape, wherein the first physical partition contains metadata of the file system comprising metadata associated with a WORM-specified file, and metadata associated with a rewritable file, the second physical partition contains a file body of a file and a copy of the metadata of the file system, and the third physical partition contains only the metadata associated with the WORM-specified file, wherein the metadata associated with the WORM-specified file is only appended on the tape at the end of the third partition when any file with a WORM attribute is added or when a previously recorded file attribute is changed to a WORM attribute, and wherein changing or deleting metadata associated with a WORM-specified file previously stored in the third partition is prohibited;
program instructions to receive a request to set a file setting of a target file to a WORM setting;
program instructions to store metadata associated with the target file in the first physical partition on the tape, the second physical partition on the tape, and the third physical partition on the tape, wherein the metadata associated with the target file in the third partition is appended at the end of the metadata associated with the WORM-specified file in response to receiving an unmounting command;
program instructions to receive a request to change the target file, wherein the request to change the target file comprises an action selected from the group consisting of: program instructions to rename the target file, program instructions to change the target file content, program instructions to delete the target file, program instructions to change an attribute of the target file;
program instructions to determine the target file metadata;
program instructions to determine that the target file metadata appears in the third physical partition;
based on determining that the target file metadata appears in the third physical partition, program instructions to reject the request to change the target file;
program instructions to determine a difference between the metadata in the first partition and the metadata associated with the WORM-specified file in the third partition based on reading the metadata in the first partition and reading the metadata associated with the WORM-specified file in the third partition.

14. The computer system of claim 13, further comprising: based on determining the difference, program instructions to transmit a notification of the difference.

15. The computer system of claim 14, wherein program instructions to determine a difference between the metadata in the first partition and the metadata associated with the WORM-specified file in the third partition comprises program instructions to determine a difference in a parameter of the metadata, wherein the parameter of the metadata is selected from the group consisting of: a full path name, a File UID, file attributes, a time stamp, and an extent list.

16. The computer system of claim 14, wherein program instructions to determine the difference between the metadata in the first partition and the metadata associated with the WORM-specified file in the third partition further comprises:
program instructions to determine appearance of multiple instances of the metadata associated with the WORM-specified file in the third partition.

17. The computer system of claim 13, further comprising program instructions to store a target file body in the second partition.

* * * * *